United States Patent
Bohling et al.

(10) Patent No.: US 8,935,455 B2
(45) Date of Patent: Jan. 13, 2015

(54) STORAGE ALLOCATION BASED ON DATA SET SIZE

(75) Inventors: Neal E. Bohling, Tucson, AZ (US);
Joseph V. Malinowski, Tucson, AZ (US); David C. Reed, Tucson, AZ (US);
Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 13/164,652

(22) Filed: Jun. 20, 2011

(65) Prior Publication Data

US 2012/0324176 A1      Dec. 20, 2012

(51) Int. Cl.
*G06F 12/00* (2006.01)
*G06F 3/06* (2006.01)
*G06F 17/30* (2006.01)

(52) U.S. Cl.
CPC .............. *G06F 3/0608* (2013.01); *G06F 17/30* (2013.01); *G06F 3/0631* (2013.01); *G06F 3/0644* (2013.01); *G06F 3/0656* (2013.01); *G06F 3/0671* (2013.01)
USPC .............................................. 711/1; 711/113

(58) Field of Classification Search
CPC combination set(s) only.
See application file for complete search history.

(56) References Cited

U.S. PATENT DOCUMENTS

| | | | |
|---|---|---|---|
| 4,310,883 | A | 1/1982 | Clifton et al. |
| 5,951,658 | A | 9/1999 | Daray, Jr. et al. |
| 6,553,476 | B1 | 4/2003 | Ayaki et al. |
| 2002/0019907 | A1 | 2/2002 | McMurdie et al. |
| 2003/0120871 | A1 | 6/2003 | Ayaki et al. |
| 2004/0220974 | A1 | 11/2004 | Cressman |
| 2010/0228708 | A1 | 9/2010 | Lehr et al. |
| 2010/0333116 | A1 | 12/2010 | Prahlad et al. |
| 2011/0060887 | A1 | 3/2011 | Thatcher et al. |

OTHER PUBLICATIONS

"EAV Data Set Uplift", IP.com No. IPCOM000176292D, Nov. 11, 2008.

*Primary Examiner* — Charles Rones
*Assistant Examiner* — Han Doan
(74) *Attorney, Agent, or Firm* — Kunzler Law Group (57) ABSTRACT

An approach to allocating storage that has track managed storage and cylinder managed storage. The approach involves receiving a request to allocate a data set for new data and determining if the size of the new data exceeds a breakpoint value. The size of the new data may be determined by allocating a buffer data set that is the size of the breakpoint value, and writing the new data to the buffer data set. If the new data only partially fills the buffer data set, then the size of the new data is smaller than the breakpoint value. If the new data overfills the buffer data set, then the size of the new data set is larger than the breakpoint value. New data that is larger than the breakpoint value is automatically stored in cylinder managed storage, while new data that is smaller than the breakpoint value is automatically stored in track managed storage.

20 Claims, 8 Drawing Sheets

STORAGE ALLOCATION BASED ON DATA SET SIZE

BACKGROUND

1. Field

The subject matter disclosed herein relates to allocating storage space for data sets based at least in part on the size of the data set.

2. Description of the Related Art

Preventing wasted storage space is an important part of many storage systems. For example, enterprise-level storage systems often store large numbers of data sets. Small amounts of wasted space associated with each data set can add up to be a large amount of wasted space in the system.

One environment in which this may occur is IBM's z/OS environment. Certain versions of z/OS, and related products, provide extended address volumes (EAVs) with two types of storage space: track-managed storage, and cylinder-managed storage. Track-managed storage is the storage on the EAV that is managed in tracks and cylinders, with each data set stored therein occupying an integral multiple of tracks. Cylinder-managed storage is managed in multi-cylinder units, and each data set stored therein occupies an integral multiple of multi-cylinder units. Requests targeted for the cylinder-managed storage are rounded up to the next multi-cylinder unit.

This system, while providing a number of advantages, may use space inefficiently. For example, a client may need to allocate a data set as part of its operations for storing data. However, the quantity of data to be stored may be unknown. The client may initiate a request to store the incoming data and specify a size of 100 cylinders, with an additional 100 cylinders to be used for overflow. The request may also include a release parameter that indicates that any unused space is to be released.

Assuming that the data sets in the cylinder-managed storage are stored in multi-cylinder units of 21 cylinders, the above request would allocate a data set in cylinder-managed storage. If there is only one track worth of data, the system will release the unused space. However, because the data is stored in cylinder-managed storage, the system can only release the space down to 21 cylinders. As a result, assuming 15 tracks per cylinder, 314 tracks are wasted and cannot be used by other data sets even though they are empty.

BRIEF SUMMARY

An approach to efficiently storing new data in storage is disclosed. The summary that follows is for convenience, and is not a limitation on the claims.

A storage allocation apparatus may include a receive module for receiving a request to allocate a data set for new data in an EAV. The EAV has track managed storage and cylinder managed storage. A buffer module may buffer the new data to a buffer data set that has a size equal to a breakpoint value in the EAV.

A storage module may automatically allocate the data set as a cylinder data set in the cylinder managed storage and copy the new data from the buffer data set to the cylinder data set if the new data overfills the buffer data set. The storage module may automatically allocate the data set as a track data set in the track managed storage and copy the new data from the buffer data set to the track data set if the new data partially fills the buffer data set.

Also disclosed is a computer program product stored in non-transitory computer readable media that includes instructions for efficiently storing new data. The instructions may include instructions for receiving a request to allocate a data set for new data, and determining if the size of the new data exceeds the breakpoint value. The computer program may determine the size of the new data using a buffer.

The computer program may also automatically store the new data to cylinder managed storage if the size of the new data exceeds the breakpoint value, and automatically store the new data to track managed storage if the size of the new data is smaller than the breakpoint value.

Also disclosed is a system for storing new data that includes a processor and a storage device. The storage device may comprise cylinder managed storage and track managed storage. The system may also include a storage allocation apparatus that receives a request to allocate a data set for new data and that determines if the size of the new data exceeds a breakpoint value. The storage allocation apparatus may automatically write the new data to the cylinder managed storage if the size of the new data exceeds the breakpoint value, and it may automatically write the new data to track managed storage if the size of the new data is smaller than the breakpoint value.

Also disclosed is a method for allocating storage. The method may involve receiving a request to allocate a data set for the new data, and determining if the size of the new data exceeds a breakpoint value. Determining the size of the new data may involve allocating a buffer data set with a size that is equal to the breakpoint value, writing the new data to the buffer data set, and determining that the size of the new data exceeds the breakpoint value if the new data partially fills the data set. The method may involve determining that the size of the new data does not exceed the breakpoint value if the new data partially fills the buffer data set.

The method may also involve automatically storing the new data to cylinder managed storage if the size of the new data exceeds the breakpoint value, and automatically storing the new data to track managed storage if the size of the new data is smaller than the breakpoint value.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
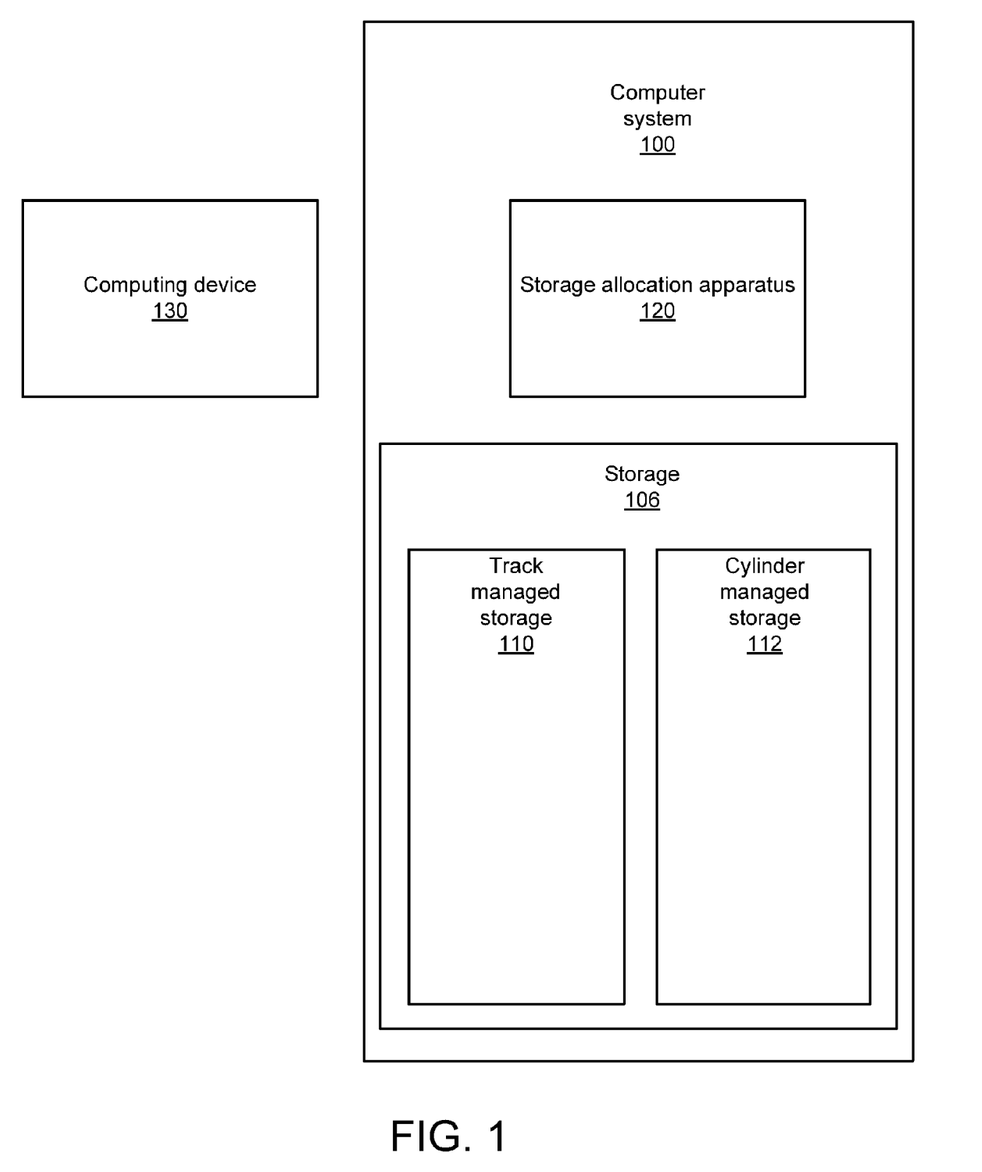
FIG. 1 is an illustrative block diagram showing one embodiment of a computer system with a storage allocation apparatus.

FIG. 1 depicts one embodiment of a computer system 100 that includes a storage allocation apparatus 120 and storage 106. The computer system 100 is a system for saving and processing information, and may include one or more computing devices 130. Examples of computer systems 100 include, but are not limited to, a desktop computer, a mainframe computer, a storage area network (SAN), or other variety of computer system 100.

The computer system 100 includes storage 106. Storage 106 is physical media on which data can be reliably stored for the computer system 100. The physical media may be, for example, tape, disk, solid state storage, or other varieties of physical media suitable for storing data. The storage 106 may be a directly attached storage device (DASD) for the computer system 100.

In the depicted embodiment, the storage 106 includes track managed storage 110 and cylinder managed storage 112. Track managed storage 110 and cylinder managed storage 112 are both storage options within EAVs. Track-managed storage 110 is managed in tracks and cylinders, with each data set stored therein occupying an integral multiple of tracks. Cylinder-managed storage 112 is managed in multi-cylinder units, and each data set stored therein occupies an integral multiple of multi-cylinder units. Requests targeted for the cylinder-managed storage 112 are rounded up to the next multi-cylinder unit. In one embodiment, the multi-cylinder unit is 21 cylinders. Thus, in one embodiment, if a request asks for an allocation of 30 cylinders, the size is rounded up to 42 cylinders.

FIG. 1 also shows a computing device 130 that may have new data to be stored in the computer system 100. The computing device 130 may be separate from the computer system 100 or, in certain embodiments, may be part of the computer system 100. The computing device 130 is communicatively connected with the computer system 100 such that the computing device 130 can send new data to the computer system 100. The computing device 130 may be communicatively connected by Ethernet, universal serial port (USB), Fibre Channel, or other varieties of communications connections that allow for data transfer.

In certain embodiments, new data on the computing device 130 needs to be stored in the storage 106. However, the size of the new data may be unknown. A program on the computer system 100 may be responsible for allocating a data set to store the new data in storage 106. If the size of new data is unknown, the program may contain code that creates a large data set, and requests that the computer system 100 release unused space in the data set after the new data has been moved to the data set.

For example, a program may be responsible for storing new data that consists of emails from the computing device 130. However, in this example, it is unknown how many emails are on the computing device 130, whether there are attachments or other files, etc. As a result, the size of the data set in storage 106 needed to store this new data is unknown. If the amount of data is small, saving the new data to track managed storage 110 will likely be the optimal storage solution; if the amount of data is large, saving the new data to cylinder managed storage 112 will likely be the optimal storage solution.

A program may allocate storage with a command such as SPACE=(CYL,(100,90), RLSE). This means that 100 cylinders will be allocated in cylinder managed storage 112 and that, if the 100 cylinders is insufficient to store the data, an additional 90 cylinders can be allocated. The RLSE parameter is one example of a release parameter. A release parameter refers to a parameter that indicates that unused storage should be released and made available for storing other data.

To continue the example above, if only two tracks worth of email are written, those two tracks would be written to a cylinder data set allocated in the cylinder managed storage 112. The computer system 100, however, can only release the unused space down to the multi-cylinder unit that is, in this case, 21 cylinders. As a result, space in the storage 106 is wasted.

The storage allocation apparatus 120 provides efficient allocation of storage 106 based on the size of the new data, even if the size of the new data is unknown when the storage space is to be allocated. The storage allocation apparatus 120 automatically determines if a data set for the new data should be allocated in track managed storage 110 or cylinder managed storage 112. The storage allocation apparatus 120 may do so without requiring any changes to the JCL or application code that initiates the allocation of storage space.

Figure 2:
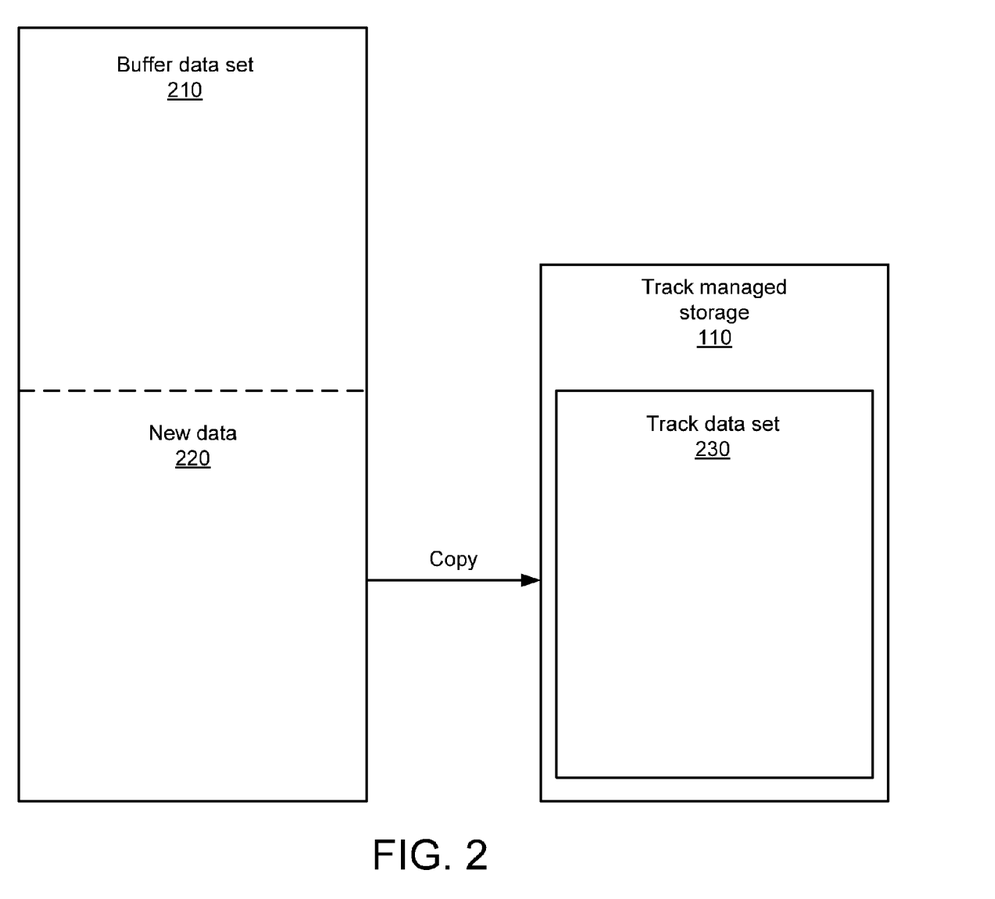
FIG. 2 is an illustrative block diagram illustrating one embodiment of a method of determining the size of new data and storing the new data to track managed storage.

FIG. 2 shows one embodiment of how a storage allocation apparatus 120 may manage data set allocation for new data of an unknown size. In one embodiment, the storage allocation apparatus 120 receives the request to allocate a data set for the new data within an EAV that comprises track managed storage 110 and cylinder managed storage 112. The request may be in the form of a command such as the one in the example given above.

The storage allocation apparatus 120 may buffer the new data 220 to the buffer data set 210. The storage allocation apparatus 120 may give the buffer data set a size equal to a breakpoint value. The breakpoint value is the size that determines whether data should be stored in track managed storage 110 or cylinder managed storage 112. The breakpoint value may be a system default value, a user-defined value, or a user-configurable default value. For example, a user may set the breakpoint value to be 10 cylinders. In this example, data sets larger than 10 cylinders are allocated in the cylinder managed storage 112, and data sets smaller than 10 cylinders are allocated in the track managed storage. The computer system 100 may be configured to allocate data sets that are equal to 10 cylinders to cylinder managed storage 112.

The storage allocation apparatus 120 may allocate the buffer data set by specifying a primary allocation amount equal to the breakpoint value and zero secondary allocation amount. For example, the command to generate the buffer data set may be SPACE=(CYL(10,0)) for a breakpoint value of 10 cylinders. The term buffer data set 210 is used to broadly encompass a variety of data structures for buffering the new data 220 as part of the decision process of where to store the new data 220. The buffer data set 210 may be a file or other storage structure allocated in volatile memory (such as RAM or DRAM), or in nonvolatile memory. The buffer data set 210 may be a data set allocated in the track managed storage 110. Other approaches for creating a buffer data set 210 may also be used.

When the job asks for a new data set allocation and is opening that data set for write, the storage allocation apparatus 120 may allocate the buffer data set 210 and associate the buffer data set 210 with that job in response. The storage allocation apparatus 120 may defer the actual allocation of a cylinder data set in cylinder managed storage 112 or a track data set in track managed storage 110. When the input/output (I/O) is issued, the storage allocation apparatus 120 may direct the I/O to the buffer data set 210 such that the new data 220 is written to the buffer data set 210.

In the embodiment shown in FIG. 2, the new data 220 only partially fills the buffer data set 210, as represented by the dashed line. In response to the new data 220 only partially filling the buffer data set 210, the storage allocation apparatus 120 automatically copies the new data 220 from the buffer data set 210 to a track data set 230 in track managed storage 110.

The storage allocation apparatus 120 may determine that the buffer data set 210 is only partially filled if a close is issued for the new data 220 before the buffer data set 210 fills up. The storage allocation apparatus 120 may then allocate the track data set 230 in the track managed storage 110. The storage allocation apparatus 120 may then copy the new data 220 from the buffer data set 210 to the newly allocated track data set 230. The storage allocation apparatus 120 may physically copy the new data 220, or perform a logical copy such as IBM's FlashCopy operation. The storage allocation apparatus 120 may release the buffer data set 210 once the new data 220 is copied to the track data set 230.

The track data set 230 may be allocated with a primary allocation amount that is equal to the breakpoint amount. The storage allocation apparatus 120 may cause the track data set 230 to be allocated with this initial primary allocation, and release any unused space after copying the new data 220. In other embodiments, the storage allocation apparatus 120 determines the size of the new data 220 held in the buffer data set 210 and allocates a track data set 230 of size substantially equal to that of the new data 220 and sufficient to hold the new data 220.

Figure 3:
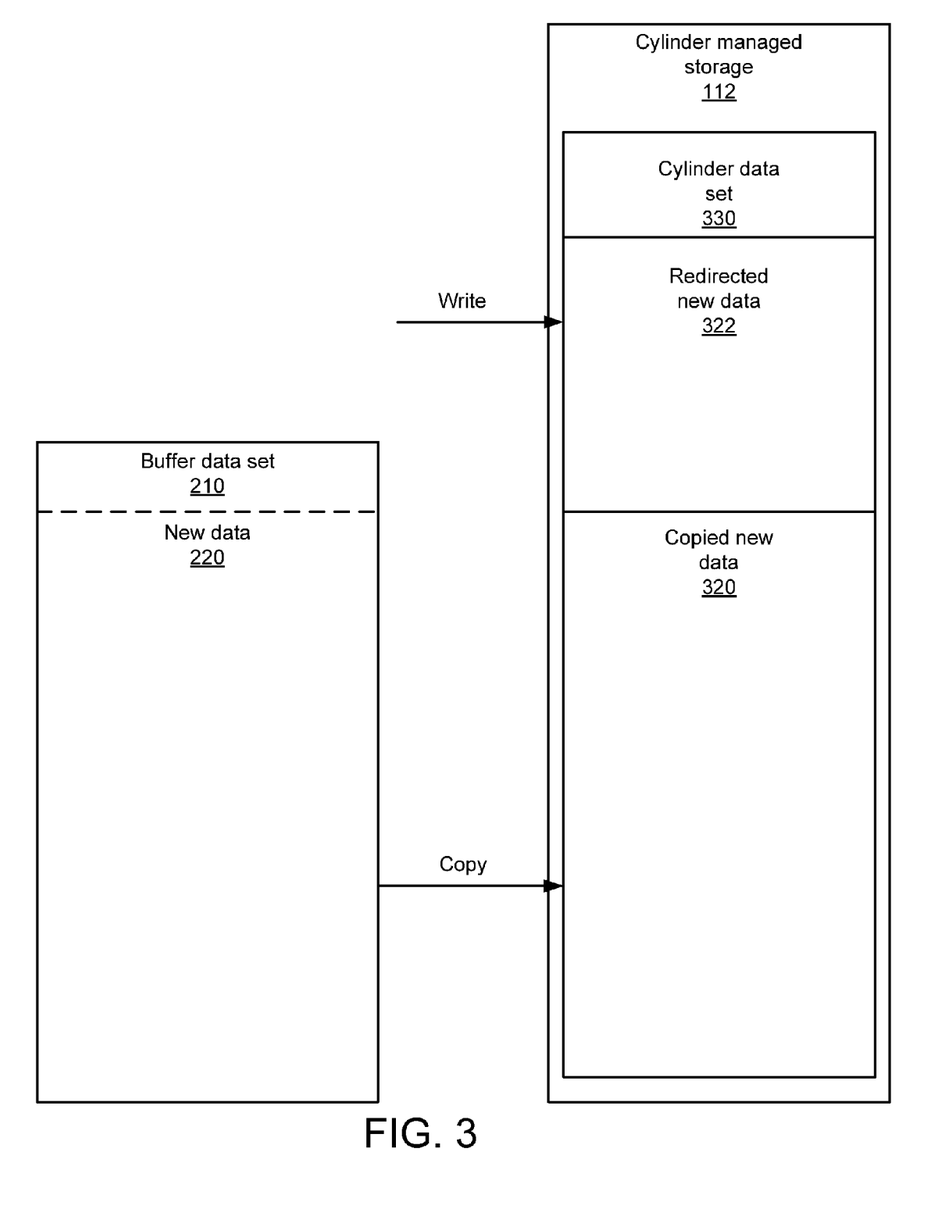
FIG. 3 is an illustrative block diagram illustrating one embodiment of a method of determining the size of new data and storing the new data to cylinder managed storage.

FIG. 3 shows one embodiment of how a storage allocation apparatus 120 may manage data set allocation for new data 220 of an unknown size. In the embodiment shown and described in FIG. 2, the new data 220 only partially filled the buffer data set 210. In FIG. 3, the new data 220 overfills the buffer data set 210; in other words, the size of the new data 220 is larger than the buffer data set 210, and the buffer data set 210 cannot store all of the new data 220.

In certain embodiments, as above, the storage allocation apparatus 120 receives the request to allocate a data set for the new data 220 within an EAV that comprises track managed storage 110 and cylinder managed storage 112. The storage allocation apparatus 120 may allocate a buffer data set 210 and buffer the new data 220 into the buffer data set 210 that has a size equal to the breakpoint value. The storage allocation apparatus 120 may delay allocating the data set specified in the request.

In certain embodiments, the size of the new data 220 will be larger than the size of the buffer data set 210. The storage allocation apparatus 120 may allocate a cylinder data set 330 in response to the new data 220 overfilling the buffer data set 210. The storage allocation apparatus 120 may allocate the cylinder data set 330 with the parameters specified in the original request to allocate a data set. For example, if the original request specified SPACE=(CYL,(100,100),RLSE), the storage allocation apparatus 120 may allocate the cylinder data set 330 as specified in this request after determining that the new data 220 is overfilling the buffer data set 210. The storage allocation apparatus 120 may round up the size of the cylinder data set 330 to the next multi-cylinder unit, as explained above.

In certain embodiments, the storage allocation apparatus 120 may pause the I/O bringing the new data 220 into the computer system 100 and copy the new data 220 written to the buffer data set 210 to the cylinder data set 330. The copy operation may physically copy the new data 220 from the buffer data set 210 to the cylinder data set 330, or it may logically copy the new data 220. The new data 220 copied from the buffer data set 210 to the cylinder data set 330 is represented in FIG. 3 as the copied new data 320.

The storage allocation apparatus 120 may resume the I/O once the new data 220 in the buffer data set 210 is copied to the cylinder data set 330. The redirected new data 322 represents the remaining new data 220 that is written to the cylinder data set 330 once it is determined that the new data 220 should be stored in a cylinder data set 330.

In certain embodiments, when the buffer data set 210 is filled, an end of volume request is triggered when the next record is written to the buffer data set 210. The storage allocation apparatus 120 may intercept the end of volume request on the buffer data set 210 that is generated when the buffer data set 210 overfills. The buffer data set 210 may be given a standard name when it is allocated, which allows the storage allocation apparatus 120 to recognize that the buffer data set 210 is being used as a buffer. The storage allocation apparatus 120 may allocate the cylinder data set 330 in response to receiving the end of volume request on the buffer data set 210.

Figure 4:
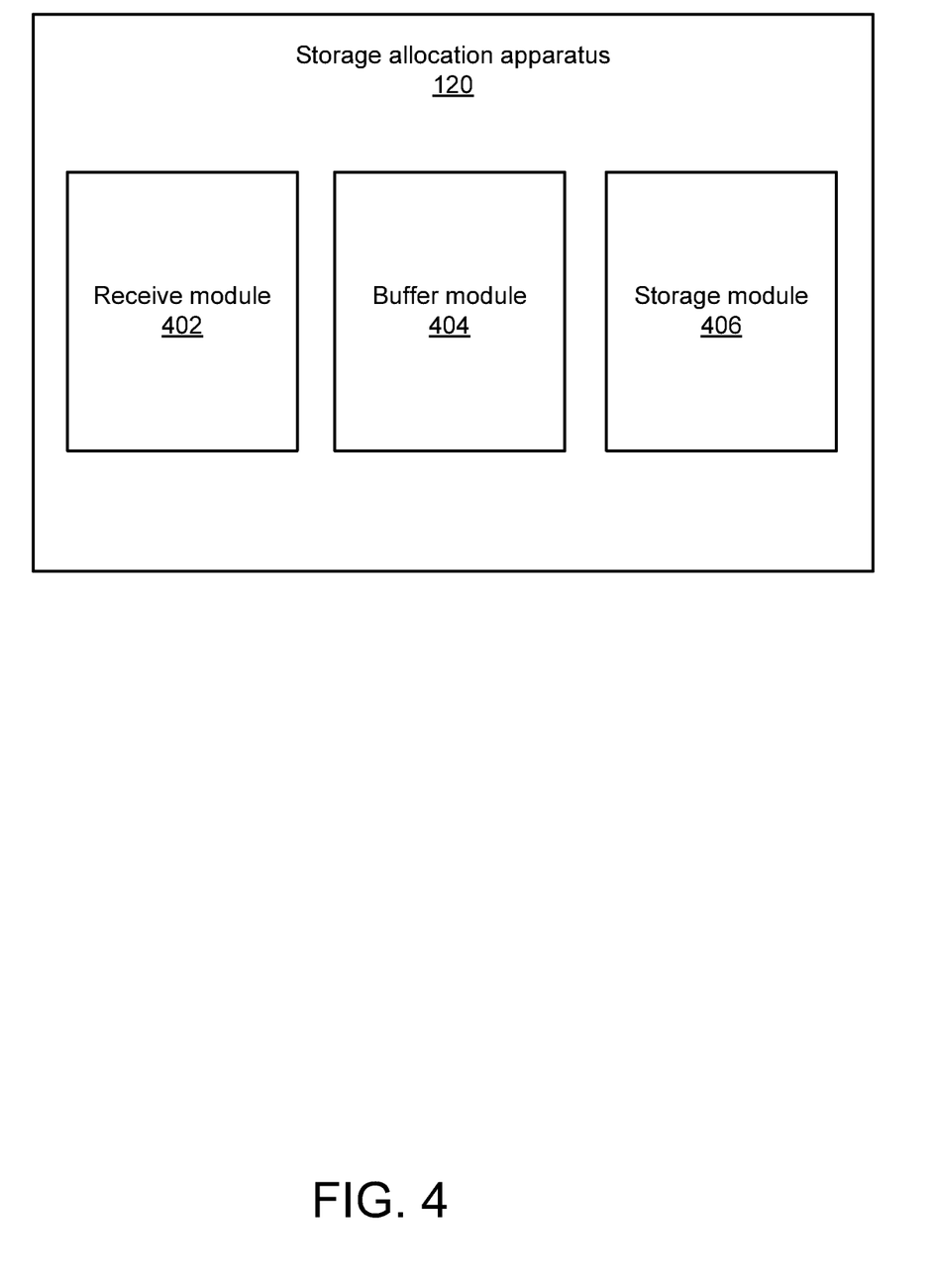
FIG. 4 is an illustrative block diagram showing one embodiment of a storage allocation apparatus.

FIG. 4 shows one embodiment of a storage allocation apparatus 120. In the depicted embodiment, the storage allocation apparatus 120 includes a receive module 402, a write module 404, and a storage module 406. The receive module 402 may be configured to receive a request to allocate a data set for new data 220 in an EAV that includes track managed storage 110 and cylinder managed storage 112. The request may be received from a user, from a program, or from a client such as a computing device 130.

The buffer module 404 may be configured to buffer the new data 220 to a buffer data set 210 that has a size equal to the breakpoint value. The buffer module 404 may also allocate the buffer data set 210 and direct the new data 220 to the buffer data set 210.

The storage module 406 may be configured to automatically copy the new data 220 from the buffer data set 210 to a cylinder data set 330 that is allocated in cylinder managed storage 112 if the new data 220 overfills the buffer data set 210. The storage module 406 may also allocate the cylinder data set 330 if the buffer data set 210 overfills, and cause the new data 220 to be copied from the buffer data set 210 to the cylinder data set 330. The storage module 406 may also cause remaining new data 220 to be written to the cylinder data set 330.

The storage module 406 may also be configured to automatically copy the new data 220 from the buffer data set 210 to a track data set 230 if the new data 220 partially fills the buffer data set 210. The storage module 406 may also allocate the track data set 230 if the new data 220 only partially fills the buffer data set 210.

Figure 5:
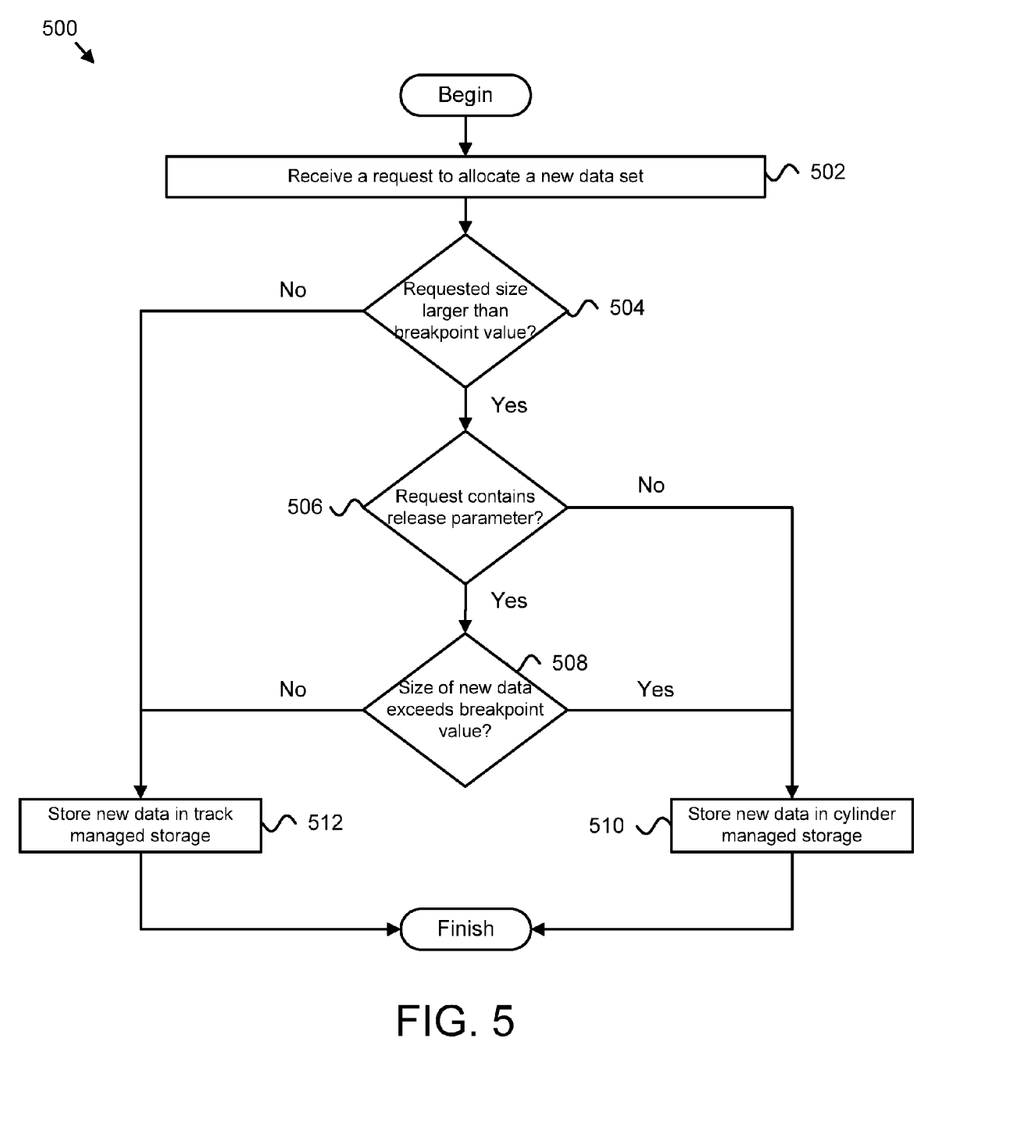
FIG. 5 is a flow chart diagram showing one embodiment of a method for determining where to store new data in a system having track managed storage and cylinder managed storage.

FIG. 5 shows one embodiment of a method 500 for storing new data 220 efficiently. The method 500 may begin with receiving 502 a request to allocate a data set for new data 220. In certain embodiments, the storage allocation apparatus 120 determines whether the request to new data 220 should be first written to a buffer data set 210 before allocating the data set in either track managed storage 110 or cylinder managed storage 112.

The storage allocation apparatus 120 may determine 504 whether the requested size of the data set is larger than the breakpoint value. The storage allocation apparatus 120 may automatically store 512 the new data 220 to track managed storage 110 without first determining the size of the new data 220 (whether by using a buffer data set 210 or though other approaches) if the requested size of the data set specified in the request is smaller than the breakpoint value.

If the requested size of the data set to be allocated is larger than the breakpoint value, the storage allocation apparatus 120 may determine 506 whether the request contains a release parameter. The storage allocation apparatus 120 may automatically store 510 the new data 220 in cylinder managed storage 112 if the request does not include a release parameter. This may allow an allocation request to allocate a data set that is larger than needed to store the new data 220, but that allows for future growth of data in the data set.

If the request does contain a release parameter, the storage allocation apparatus 120 may determine 508 if the size of the new data 220 exceeds the breakpoint value. One approach for determining if the size of the new data 220 exceeds the breakpoint value is to allocate a buffer data set 210 as described above. In certain embodiments, other approaches for determining if the size of the new data 220 exceeds the breakpoint value may also be used.

For example, the storage allocation apparatus 120 may allocate a track data set 230 with a size equal to the breakpoint value in track managed storage 110 and store new data 220 to the track data set 230. If the new data 220 overfills the track data set 230, the storage allocation apparatus 120 may allocate a cylinder data set 330 in cylinder managed storage 112 and store the new data 220 in the cylinder data set 330 as described above in connection with the buffer data set 210. If the new data 220 does not overfill the track data set 230, the storage allocation apparatus 120 may allow the track data set 230 to remain. Such an embodiment may thus determine the size of the new data 220 without using a buffer data set 210.

If the size of the new data 220 does not exceed the breakpoint value, the storage allocation apparatus 120 may store 512 the new data 220 in track managed storage 110. If the size of the new data 220 exceeds the breakpoint value, the storage allocation apparatus 120 may store 510 the new data 220 in cylinder managed storage 112.

Figure 6:
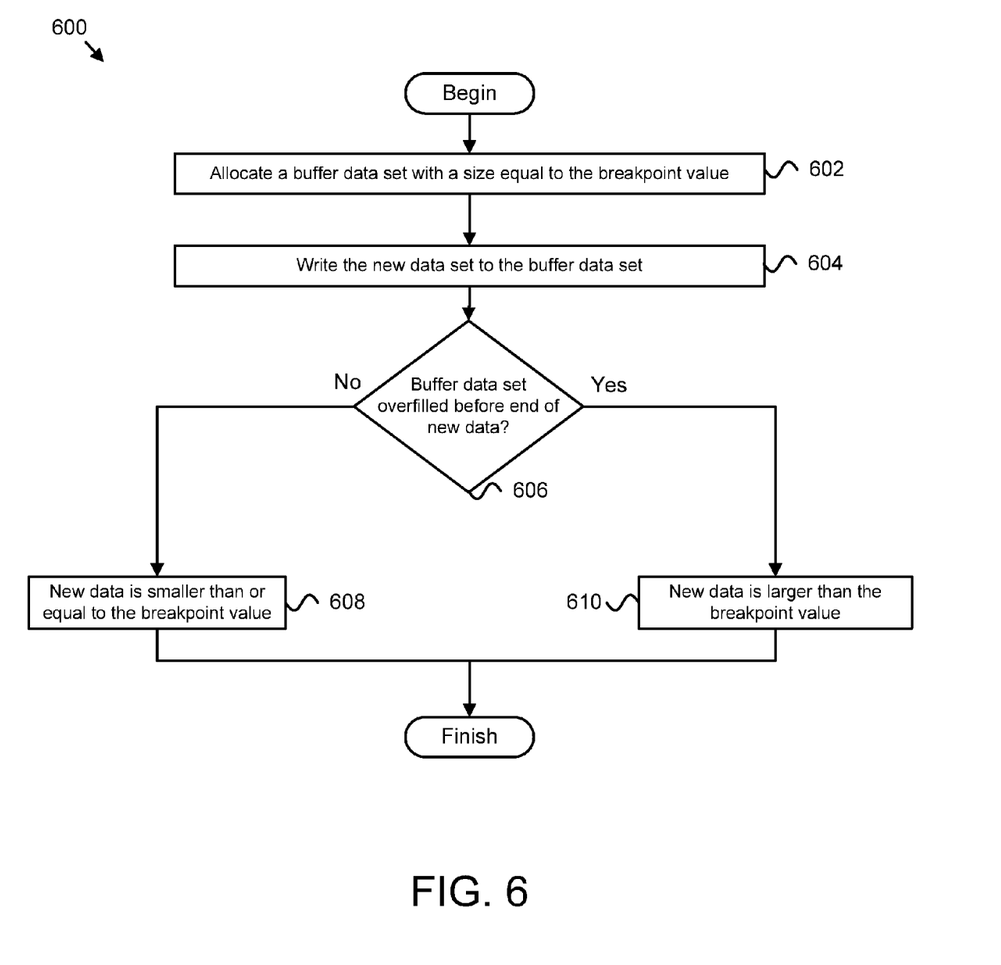
FIG. 6 is a flow chart diagram showing one embodiment of a method for determining the size of new data.

FIG. 6 shows one embodiment of a method 600 for determining the size of the new data 220. The method 600 may begin with allocating 602 a buffer data set 210 with a size equal to the breakpoint value. The method 600 may further involve writing 604 the new data 220 to the buffer data set 210 and determining 606 whether the buffer data set 210 is overfilled before the end of the new data 220. In certain embodiments, the storage allocation apparatus 120 determines that the buffer data set 210 has overfilled if an end of volume request is generated for the buffer data set 210 before a close command indicating that the new data 220 has been completely transferred is received.

If the buffer data set 210 is overfilled before the end of the new data 220, the method 600 may involve concluding 610 that the new data 220 is larger than the breakpoint value. If the buffer data set 210 is not overfilled before the end of the new data 220, the method 600 may involve concluding 608 that the new data 220 is smaller than, or equal to, the breakpoint value.

Figure 7:
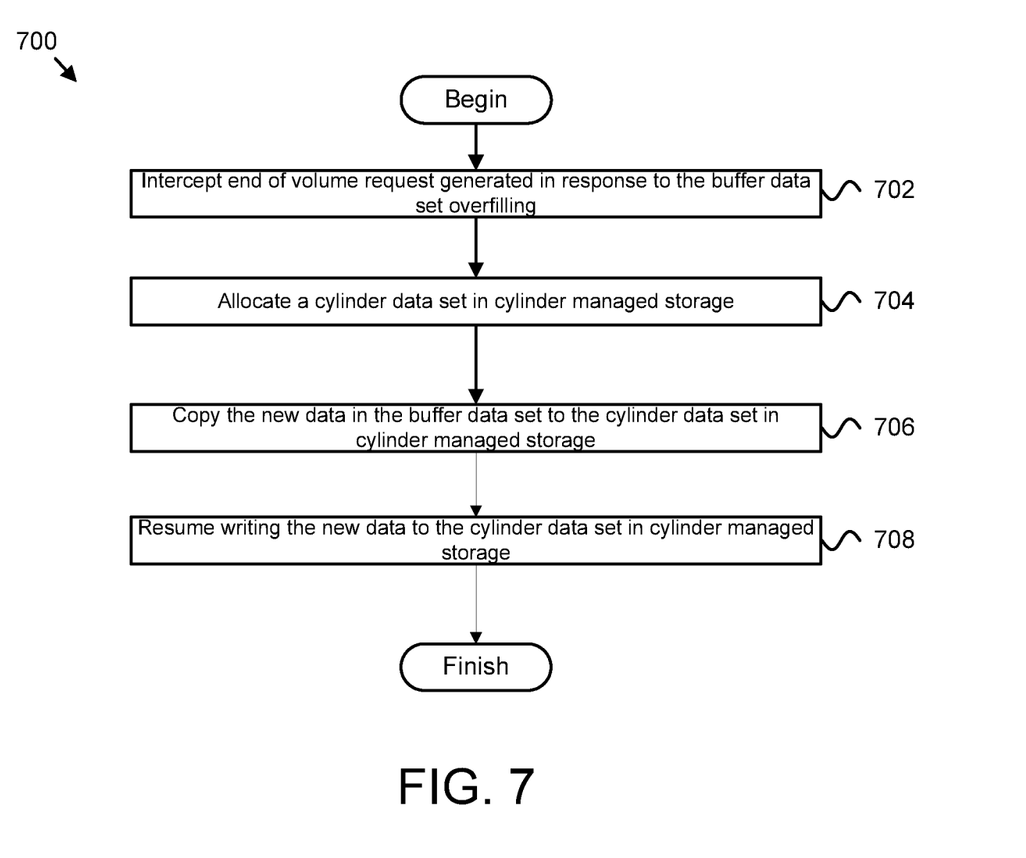
FIG. 7 is a flow chart diagram showing one embodiment of a method for storing new data to cylinder managed storage.

FIG. 7 shows one embodiment of a method 700 for allocating a cylinder data set 330 in cylinder managed storage 112. The method 700 may begin with intercepting 702 an end of volume request generated in response to the buffer data set 210 overfilling. Naming conventions for the buffer data set 210 may allow the storage allocation apparatus 120 to recognize that a buffer data set 210 has generated the end of volume request, and allow the storage allocation apparatus 120 to appropriately name and configure a cylinder data set 330. The method 700 may also involve allocating 704 a cylinder data set 330 in the cylinder managed storage 112 in response to intercepting the end of volume request. The cylinder data set 330 may be allocated with the size specified in the allocation request.

The method 700 may also involve copying 706 the new data 220 in the buffer data set 210 from the buffer data set 210 to the newly allocated cylinder data set 330 in the cylinder managed storage 112. The copy operation may be a physical copy or a logical copy of the new data 220. The method 700 may also involve resuming 708 the write operations for the new data 220 once the copy operation is complete. The write operations are directed to the cylinder data set 330 in the cylinder managed storage 112. As a result, the new data 220 is stored in cylinder managed storage 112. In certain embodiments, the method 700 may also comprise executing a release operation on the cylinder data set 330 after the new data 220 is stored to the cylinder data set 330. The method 700 may also involve closing the buffer data set 210 once the new data 220 has been copied.

Figure 8:
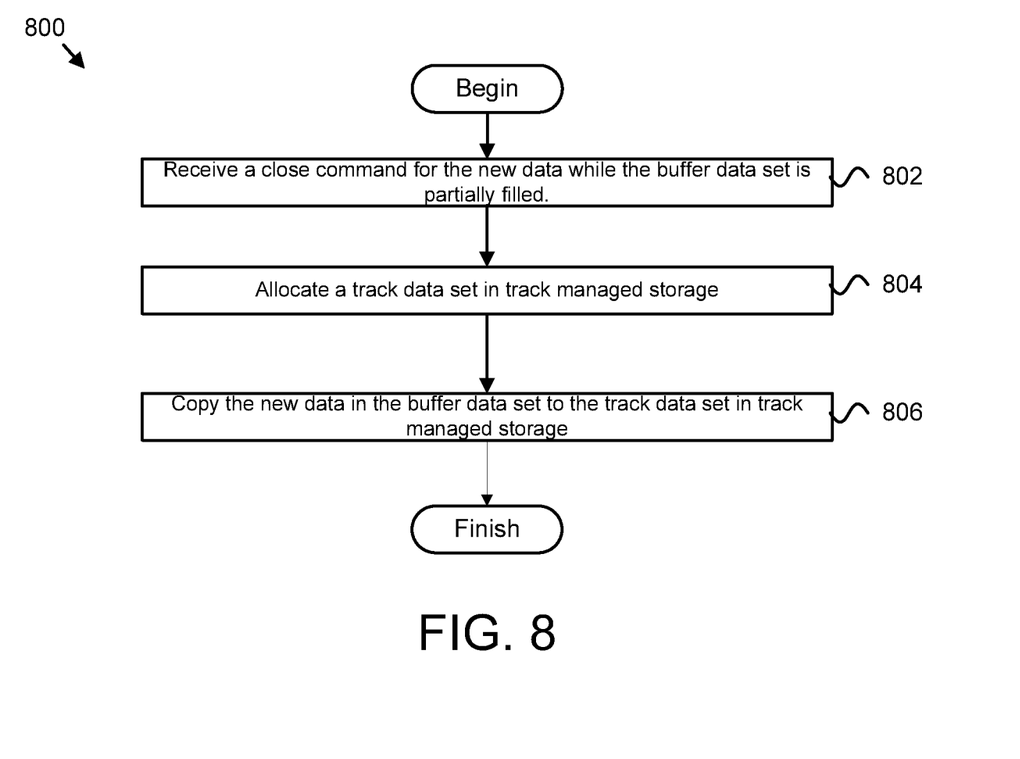
FIG. 8 is a flow chart diagram illustrating one embodiment of a method for storing new data to track managed storage.

FIG. 8 shows one embodiment of a method 800 for allocating a track data set 230 in track managed storage 110. In one embodiment, the method 800 involves receiving 802 a close command for the new data 220 while the buffer data set 210 is partially filled. For example, if the buffer data set 210 is set to a size of 10 cylinders, the close command may be received when 5 cylinders worth of new data 220 has been received and written to the buffer data set 210.

The method 800 may further involve allocating 804 a track data set 230 in track managed storage 110 in response to receiving the close command while the buffer data set 210 is partially filled. The storage allocation apparatus 120 may allocate a track data set 230 with a size equal to the breakpoint value. The storage allocation apparatus 120 may allocate the track data set 230 with a size equal to the breakpoint value, minus one cylinder. Other sizes may be allocated for the track data set 230.

The method 800 may also involve copying 806 the new data 220 in the buffer data set 210 to the track data set 230 in the track managed storage 110. The copy operation may involve physical copying the new data 220, or logically copying the new data 220. The method 800 may also involve closing the buffer data set 210 once the new data 220 has been copied.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A storage allocation apparatus comprising:
a processor;
a memory comprising a non-transitory computer readable storage medium;
a receive module for receiving a request to allocate a data set for new data in an extended addressable volume (EAV) comprising track managed storage and cylinder managed storage;
a buffer module for buffering the new data to a buffer data set having a size equal to a breakpoint value;
a storage module for automatically allocating the data set as a cylinder data set in the cylinder managed storage and copying the new data from the buffer data set to the cylinder data set in response to the new data overfilling the buffer data set; and
the storage module further configured for automatically allocating the data set as a track data set in the track managed storage and copying the new data from the buffer data set to the track data set in response to the new data partially filling the buffer data set,
wherein at least a portion of the receive module, the buffer module, and the storage module comprise one or more of hardware and executable code, the executable code stored on the memory and executed by the processor.

2. The apparatus of claim 1, the buffer module further configured to direct a write operation to write remaining new data to the cylinder data set in response to the new data overfilling the buffer data set.

3. A computer program product comprising non-transitory computer readable media that stores code executable by a processor, the executable code comprising instructions for:
receiving a request to allocate a data set for new data in an extended addressable volume (EAV) comprising track managed storage and cylinder managed storage;
buffering the new data to a buffer data set having a size equal to a breakpoint value;
determining if a size of the new data exceeds the breakpoint value;
automatically allocating the data set as a cylinder data set in the cylinder managed storage and writing the new data to cylinder managed storage in response to the size of the new data exceeding the breakpoint value; and
automatically allocating the data set as a track data set in the track managed storage and writing the new data to track managed storage in response to the size of the new data being smaller than the breakpoint value.

4. The computer program product of claim 3, wherein buffering the new data to a buffer data set comprises allocating a buffer data set with a size equal to the breakpoint value and writing the new data to the buffer data set, wherein determining if the size of the new data exceeds the breakpoint value comprises:
determining that the size of the new data exceeds the breakpoint value in response to the new data overfilling the buffer data set; and
determining that the size of the new data does not exceed the breakpoint value in response to the new data partially filling the buffer data set.

5. The computer program product of claim 4, wherein determining that the size of the new data exceeds the breakpoint value comprises intercepting an end of volume request generated in response to the buffer data set filling.

6. The computer program product of claim 4, further comprising, in response to determining that the new data exceeds the breakpoint value:
copying the new data in the buffer data set to the data set in cylinder managed storage; and
continuing writing the new data to the data set in cylinder managed storage.

7. The computer program product of claim 6, wherein copying the new data further comprises performing a logical copy operation between the buffer data set and the data set in cylinder managed storage.

8. The computer program product of claim 4, wherein determining that the size of the new data does not exceed the breakpoint value further comprises receiving a close command for the new data while the buffer data set is partially filled.

9. The computer program product of claim 4, further comprising copying the new data in the buffer data set to the track managed storage, in response to determining that the size of the new data does not exceed the breakpoint value.

10. The computer program product of claim 4, wherein the buffer data set is allocated with a primary allocation amount equal to the breakpoint value and a secondary allocation amount equal to zero.

11. The computer program product of claim 3, further comprising allocating the data set as specified in the request without determining the size of the new data in response to determining that the request lacks a release parameter.

12. The computer program product of claim 3, further comprising allocating the data set in track managed storage without determining the size of the new data in response to the request having a primary allocation and a secondary allocation that sum to a value smaller than the breakpoint value.

13. A system comprising:
a processor;
a storage device comprising:
cylinder managed storage; and
track managed storage; and
a storage allocation apparatus configured to:
receive a request to allocate a data set for new data;
buffering the new data to a buffer data set having a size equal to a breakpoint value;
determine if a size of the new data exceeds the breakpoint value;
automatically allocate the data set as a cylinder data set in the cylinder managed storage and write the new data to the cylinder managed storage in response to the size of the new data exceeding the breakpoint value; and
automatically allocate the data set as a track data set in the track managed storage and write the new data to the track managed storage in response to the size of the new data being smaller than the breakpoint value.

14. The system of claim 13, wherein the storage allocation apparatus is further configured to:
allocate a buffer data set with a size equal to the breakpoint value;
write the new data to the buffer data set;
determine that the size of the new data exceeds the breakpoint value in response to the new data overfilling the buffer data set; and
determine that the size of the new data does not exceed the breakpoint value in response to the new data partially filling the buffer data set.

15. The system of claim 14, wherein the storage allocation apparatus, in response to determining that the size of the new data exceeds the breakpoint value, is further configured to:
allocate a data set in the cylinder managed storage;
copy the new data in the buffer data set to the data set in the cylinder managed storage; and
continue writing the new data to the data set in the cylinder managed storage.

16. The system of claim 14, wherein the storage allocation apparatus, in response to determining that the size of the new data does not exceed the breakpoint value, is further configured to:
allocate a data set in track managed storage; and
copy the new data in the buffer data set to the track managed storage.

17. A method comprising:
a processor;
a memory comprising a non-transitory computer readable storage medium to store executable code executed by the processor;
receiving a request to allocate a data set for new data;
determining if a size of the new data exceeds a breakpoint value, further comprising:
allocating a buffer data set with a size equal to the breakpoint value;
writing the new data to the buffer data set;
determining that the size of the new data exceeds the breakpoint value in response to the new data overfilling the buffer data set; and
determining that the size of the new data does not exceed the breakpoint value in response to the new data partially filling the buffer data set;
automatically storing the new data to cylinder managed storage in response to the size of the new data exceeding the breakpoint value; and
automatically storing the new data to track managed storage in response to the size of the new data being smaller than the breakpoint value.

18. The method of claim 17, wherein determining that the size of the new data exceeds the breakpoint value comprises intercepting an end of volume request generated in response to the buffer data set filling.

19. The method of claim 17, further comprising, in response to determining that the size of the new data exceeds the breakpoint value:
allocating a data set in cylinder managed storage;
copying the new data in the buffer data set to the data set in cylinder managed storage; and
continuing writing the new data to the data set in cylinder managed storage.

20. The method of claim 17, further comprising, in response to determining that the size of the new data does not exceed the breakpoint value:
allocating a data set in the track managed storage; and
copying the new data in the buffer data set to the track managed storage.

* * * * *